United States Patent
Miyagawa

(10) Patent No.: US 11,248,693 B2
(45) Date of Patent: Feb. 15, 2022

(54) VEHICLE GEAR

(71) Applicant: TOYOTA JIDOSHA KABUSHIKI KAISHA, Toyota (JP)

(72) Inventor: Takeshi Miyagawa, Toyokawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/596,976

(22) Filed: Oct. 9, 2019

(65) Prior Publication Data

US 2020/0124156 A1 Apr. 23, 2020

(30) Foreign Application Priority Data

Oct. 17, 2018 (JP) .............................. JP2018-196159

(51) Int. Cl.
    *F16H 55/17* (2006.01)
    *B60K 6/365* (2007.10)
    *B60K 6/547* (2007.10)

(52) U.S. Cl.
    CPC .............. *F16H 55/17* (2013.01); *B60K 6/365* (2013.01); *B60K 6/547* (2013.01)

(58) Field of Classification Search
    CPC ...... F16H 55/17; F16H 55/18; F16H 57/0006; F16H 55/14
    USPC ......................................................... 74/434
    See application file for complete search history.

(56) References Cited

U.S. PATENT DOCUMENTS

| | | | | |
|---|---|---|---|---|
| 5,890,398 A | * | 4/1999 | Matsuno | B60K 17/02 74/433.5 |
| 7,261,247 B2 | * | 8/2007 | Yeh | B05B 3/0431 239/237 |
| 8,733,198 B2 | * | 5/2014 | Teramoto | F16H 55/17 74/446 |
| 8,826,765 B2 | * | 9/2014 | Teramoto | F16H 55/14 74/434 |
| 2002/0096006 A1 | * | 7/2002 | Hahlbrock | F16H 55/17 74/446 |
| 2006/0210354 A1 | | 9/2006 | Kohno et al. | |
| 2009/0042655 A1 | * | 2/2009 | Iwata | B23K 26/38 464/98 |

FOREIGN PATENT DOCUMENTS

| | | |
|---|---|---|
| DE | 311406 C | 9/1917 |
| JP | 2006258180 A | 9/2006 |
| JP | 2011-247348 A | 12/2011 |

* cited by examiner

*Primary Examiner* — Jake Cook
*Assistant Examiner* — Gregory Robert Weber
(74) *Attorney, Agent, or Firm* — Oliff PLC

(57) ABSTRACT

A vehicle gear includes: a disk portion having a disk shape and a plurality of through holes formed in a circumference direction thereof; and an outer circumference portion having outer circumference teeth formed on an outer circumference side of the disk portion. Further, each of the through holes includes first and second holes (82A, 82B) formed on one and another ends, respectively, thereof in the circumference direction, and a width of the first hole is larger than a width of the second hole in a radial direction of the disk portion.

2 Claims, 5 Drawing Sheets

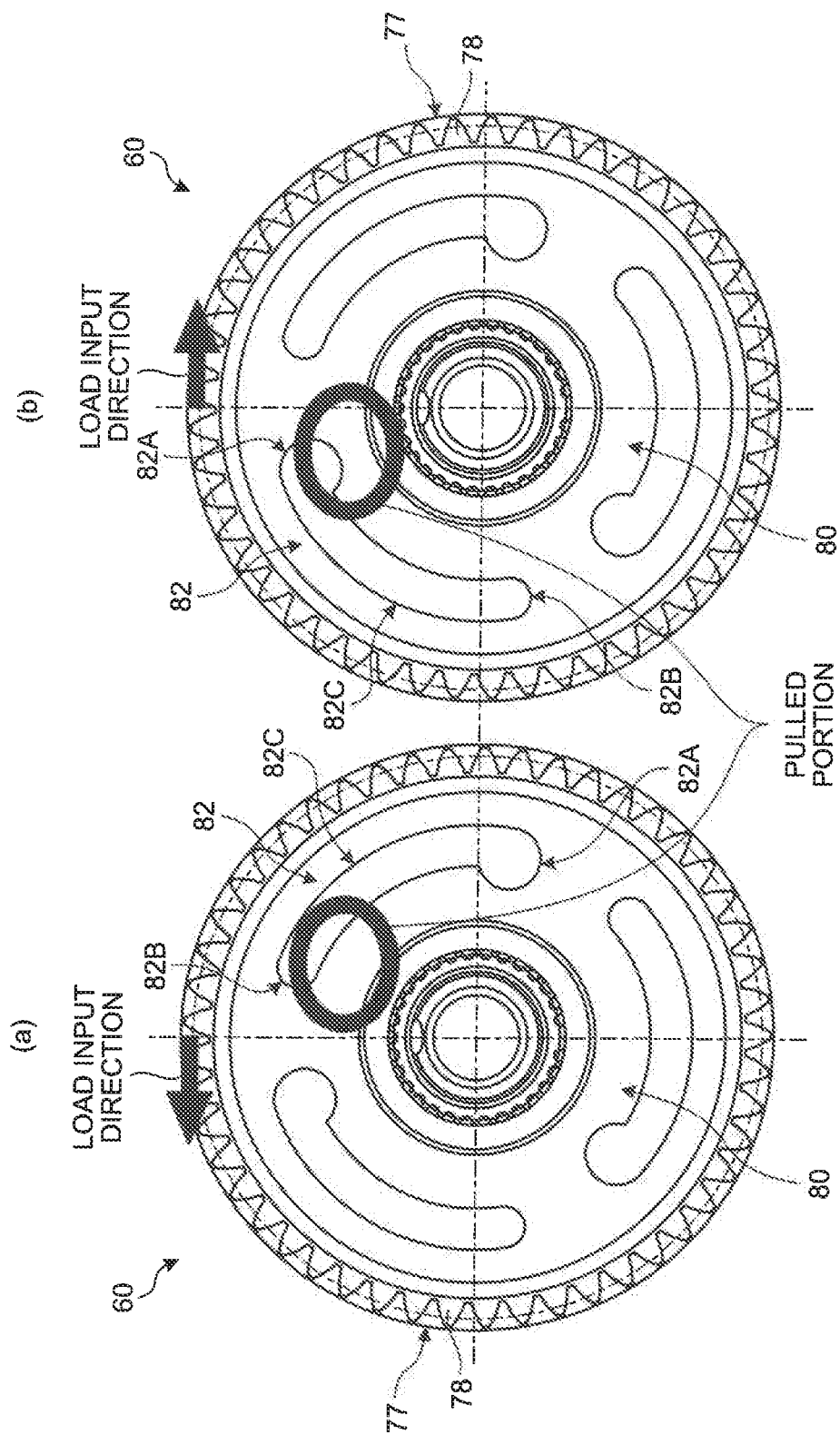

VEHICLE GEAR

CROSS-REFERENCE TO RELATED APPLICATION(S)

The present application claims priority to and incorporates by reference the entire contents of Japanese Patent Application No. 2018-196159 filed in Japan on Oct. 17, 2018.

BACKGROUND

The present disclosure relates to a vehicle gear.

Japanese Laid-open Patent Publication No. 2011-247348 discloses a vehicle gear including a disk portion having a plurality of through holes formed in a circumference direction and an outer circumference portion having outer circumference teeth formed on the outer circumference side of the disk portion. The through holes are formed to have a shape resulting in the stiffness of the outer circumference portion being larger in portion corresponding to an end portion of the through hole in the circumference direction than in a portion corresponding to a center portion of the through hole in the circumference direction, to reduce gear noise.

SUMMARY

There is a need for providing a vehicle gear that can reduce gear noise without largely compromising strength.

According to an embodiment, a vehicle gear includes: a disk portion having a disk shape and a plurality of through holes formed in a circumference direction thereof; and an outer circumference portion having outer circumference teeth formed on an outer circumference side of the disk portion. Further, each of the through holes includes first and second holes (82A, 82B) formed on one and another ends, respectively, thereof in the circumference direction, and a width of the first hole is larger than a width of the second hole in a radial direction of the disk portion.

DETAILED DESCRIPTION

In the related art, in order to suppress gear noise, it is effective to make the through hole larger so as to have lower rigidity, but conversely, the strength is reduced. In the vehicle gear disclosed in Japanese Laid-open Patent Publication No. 2011-247348, the through holes have a symmetrical shape in the circumference direction, and there has been a problem that the gear noise reduction effect cannot be sufficiently obtained due to the limitation in terms of strength.

An embodiment of a vehicle gear according to the present disclosure will be described below. The present disclosure is not limited by the present embodiment.

Figure 1:
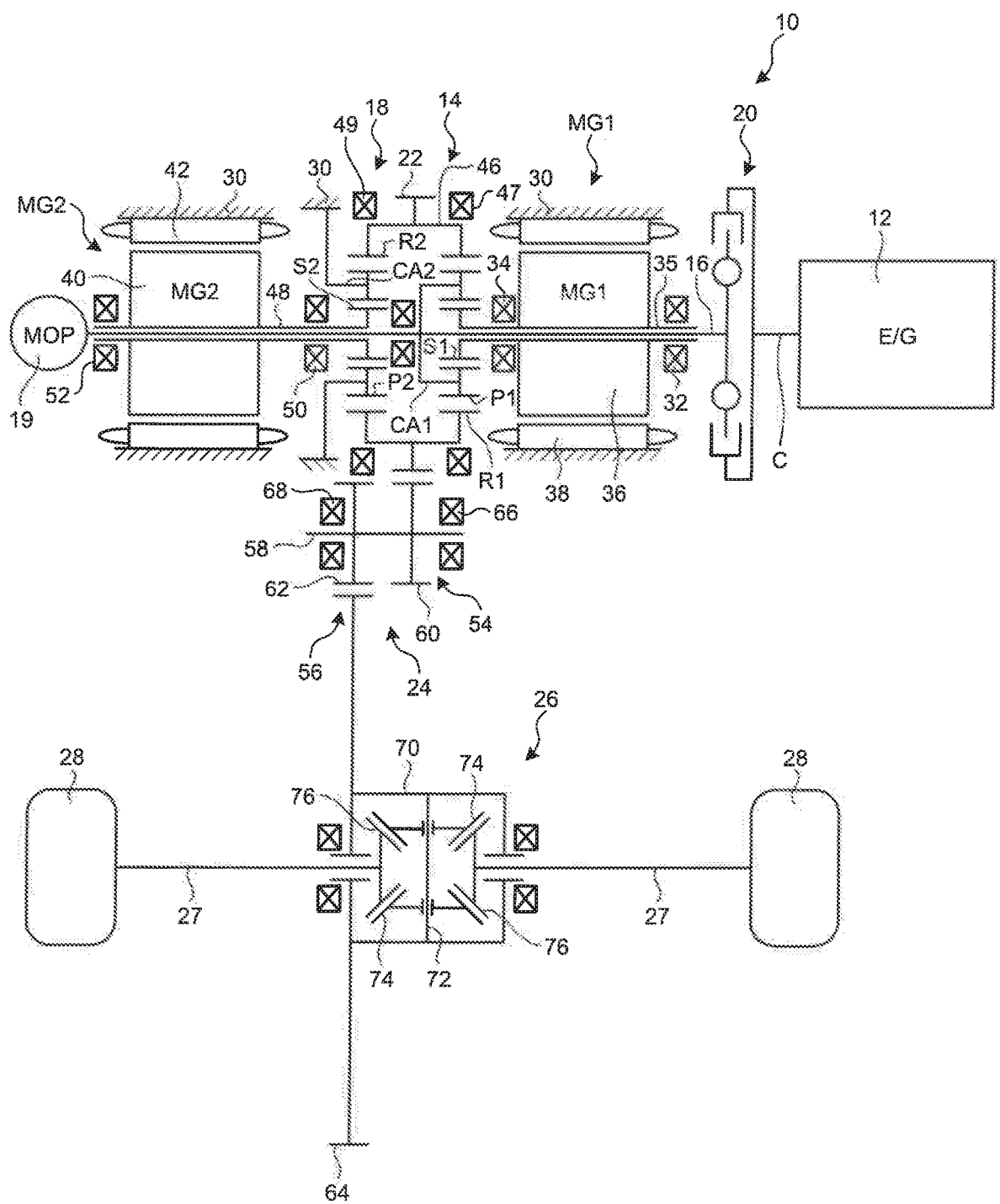
FIG. 1 is a skeleton diagram of a power transmission device of a hybrid vehicle according to an embodiment.

FIG. 1 is a skeleton diagram of a power transmission device 10 of a hybrid vehicle according to the embodiment. As illustrated in FIG. 1, the hybrid vehicle includes an engine (E/G) 12. The power transmission device 10 includes a first motor MG1, a first planetary gear mechanism 14, a second motor MG2, and a second planetary gear mechanism 18 that are arranged along a common axis C. The first planetary gear mechanism 14 serves as a power distribution mechanism that is coupled to the engine 12 and the first motor MG1 in a power transmittable manner, and appropriately distributes driving force from the engine 12 to the first motor MG1 and an output gear 22 described later. The second planetary gear mechanism 18 functions as a reduction gear that decelerates the rotation of the second motor MG2. Furthermore, a mechanical oil pump (MOP) 19 is connected to an end portion on a side opposite to that on which the engine 12 is provided, in an axial direction. The oil pump 19 is actuated by rotation of an input shaft 16 to which an output from the engine 12 is input.

The first motor MG1 and the second motor MG2 serve as what is known as a motor generator also having a power generation function. The first motor MG1 that functions as a differential motor for controlling a differential state of power distribution mechanism at least has a generator (power generation) function for generating reaction force. The second motor MG2 coupled to a driving wheel 28 in a power transmittable manner functions as a traveling motor that outputs driving force to serve as a source of driving force for traveling, and thus at least has a motor (motor) function.

The first motor MG1 includes a cylindrical rotating member 35, a rotor 36, and a stator 38, on the axis C. The rotating member 35 has both ends, in the axial direction, rotatably supported by a bearing 32 and a bearing 34. The rotor 36 functions as a rotating body having an inner circumference end integrally connected to the rotating member 35. The stator 38 functions as a static member that is connected to a case 30 (a non-rotating member disposed on the outer circumference side of the rotor 36) to be fixed in a non-rotatable manner. The rotating member 35 has an end portion, on the side closer to the oil pump 19, connected to a sun gear S1 of the first planetary gear mechanism 14 described later.

The second motor MG2 includes a cylindrical rotating member 48, a rotor 40, and a stator 42, on the axis C. The rotating member 48 has both ends, in the axial direction, rotatably supported by a bearing 50 and a bearing 52. The rotor 40 functions as a rotating body having an inner circumference end integrally connected to the rotating member 48. The stator 42 functions as a static member that is connected to the case 30 (the non-rotating member disposed on the outer circumference side of the rotor 40) to be fixed in a non-rotatable manner. The rotating member 48 has an end portion, on the side closer to the engine 12 in the axial direction, connected to a sun gear S2 of the second planetary gear mechanism 18 described later.

The first planetary gear mechanism 14 is configured to be a single pinion planetary gear device, and includes the sun gear S1, a ring gear R1 that is coaxially disposed with the sun gear S1 and meshes with the sun gear S1 via a pinion gear P1, and a carrier CA1. The pinion gear P1 is supported by the carrier CA1 to be capable of rotating and revolving. The sun gear S1 of the first planetary gear mechanism 14 is coupled to the rotor 36 of the first motor MG1 via the rotating member 35. The carrier CA1 is coupled to the engine 12 via the input shaft 16 and a damper device 20. The ring gear R1 is operatively connected to left and right driving wheels 28 via the output gear 22, a reduction mechanism 24, a differential device 26, and left and right axles 27.

The second planetary gear mechanism 18 is arranged side by side with the first planetary gear mechanism 14 in the axial direction along the axis C common to these mechanisms, and functions as a reduction device with which the rotation of the second motor MG2 is decelerated and output. The second planetary gear mechanism 18 is configured to be a single pinion planetary gear device, and includes the sun gear S2, a ring gear R2 that is coaxially disposed with the sun gear S2 and meshes with the sun gear S2 via a pinion gear P2, and a carrier CA2. The pinion gear P2 is supported by the carrier CA2 to be capable of rotating and revolving. The sun gear S2 of the second planetary gear mechanism 18 is coupled to the rotor 40 of the second motor MG2 via the rotating member 48. The carrier CA2 is coupled to the case 30 that is a non-rotating member. The ring gear R2 is operatively connected to the left and right driving wheels 28 via the output gear 22, the reduction mechanism 24, the differential device 26, and the left and right axles 27, as in the case of the ring gear R1. With the above configuration, the rotation of the second motor MG2, input from the sun gear S2, is decelerated and output from the ring gear R2.

Furthermore, a compound gear 46, employed in the present embodiment, is rotatably supported by a bearing 47 and a bearing 49. The compound gear 46 is formed with inner teeth of the ring gear R1 of the first planetary gear mechanism 14 and inner teeth of the ring gear R2 arranged along the axial direction, and with outer teeth of the output gear 22 formed on the outer circumference side, to have what is known as a compound structure.

The reduction mechanism 24 mainly includes a counter gear pair 54 and a final gear pair 56. The counter gear pair 54 includes the output gear 22 that functions as a counter drive gear, and a counter driven gear 60 that meshes with the output gear 22 while being fixed to a counter shaft 58. The final gear pair 56 include a final drive gear 62 fixed to the counter shaft 58 and a final driven gear 64 which is formed to have a diameter larger than that of the final drive gear 62 and meshes with the final drive gear 62. Both ends of the counter shaft 58 in the axial direction are rotatably supported by a bearing 66 and a bearing 68, and the counter driven gear 60 and the final drive gear 62 are rotated at the same rotation speed, in response to a rotation of the counter shaft 58. In the reduction mechanism 24, the rotation of the output gear 22 is decelerated and transmitted to the final driven gear 64.

The differential device 26 is of a known bevel gear type, and includes a differential case 70 connected to the final driven gear 64, a pinion shaft 72 having both end portions supported by the differential case 70, a pinion gear 74 that is fitted on the pinion shaft 72 relatively rotatable around an axis of the pinion shaft 72, and a pair of side gears 76 that mesh with the pinion gear 74. The pair of side gears 76 are spline fitted to the left and right axles 27, respectively, to be integrally rotated.

Here, it is known that, for example, in the meshing portion of the output gear 22 (counter drive gear) constituting the counter gear pair 54 and the counter driven gear 60, gear noise is generated with the meshing of the gears serving as an oscillation source.

In the present embodiment, the gear noise is reduced by varying dynamic stiffness for a meshing point of a gear by varying the stiffness (strength) of an outer circumference portion 77 of the gear in a circumference direction (rotational direction) to thereby vary the vibration characteristics of the gear in a complex manner. For example, repetition of the same dynamic stiffness results in the vibration characteristics kept constant despite a change in the meshing point of the gear. Thus, in a case that a resonant frequency of a surface of the case 30 and the like match or in the other like cases, vibration amplification is always repeated to result in large gear noise. On the other hand, when the dynamic stiffness of the gear with respect to the meshing point varies in a complicated manner, the vibration characteristics vary in a complicated manner according to the meshing position of the gear, whereby the vibration amplification is suppressed and the gear noise is reduced.

Figure 2:
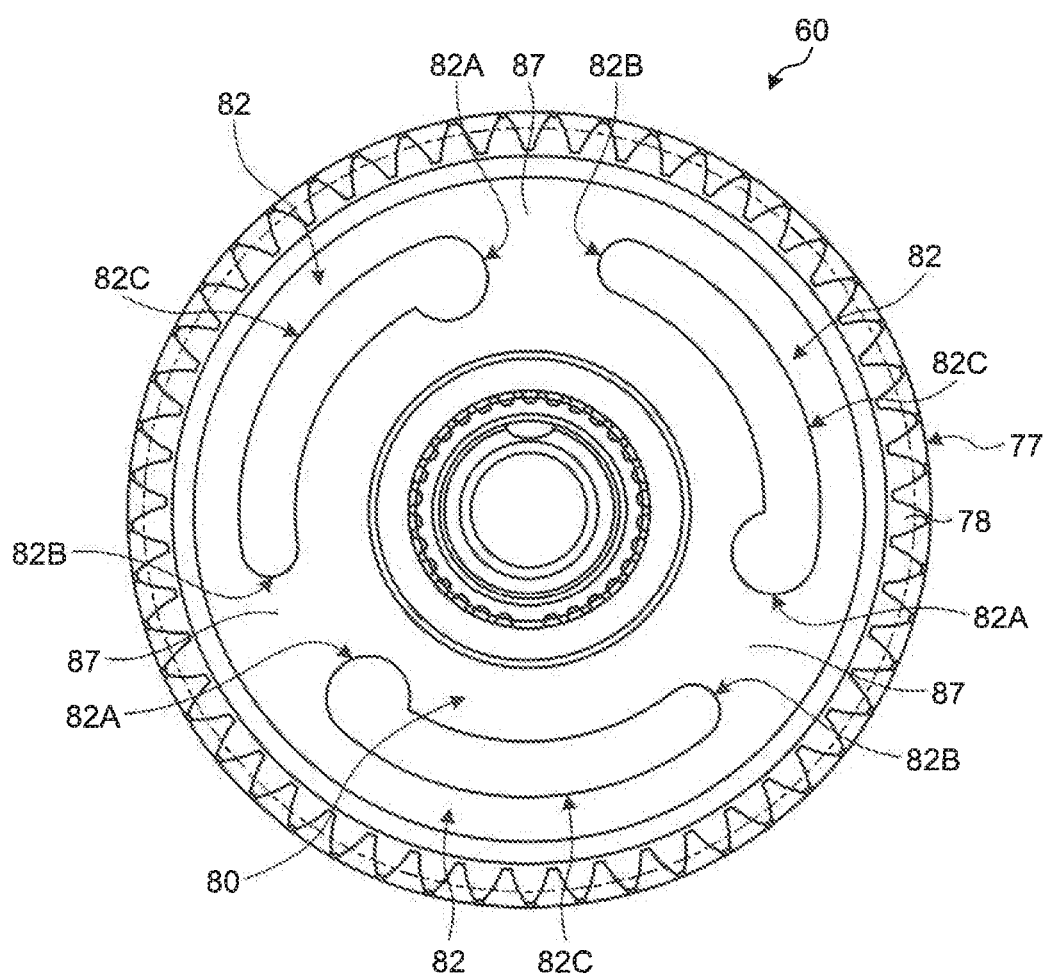
FIG. 2 is a diagram illustrating a shape of a counter driven gear.
Figure 3A:
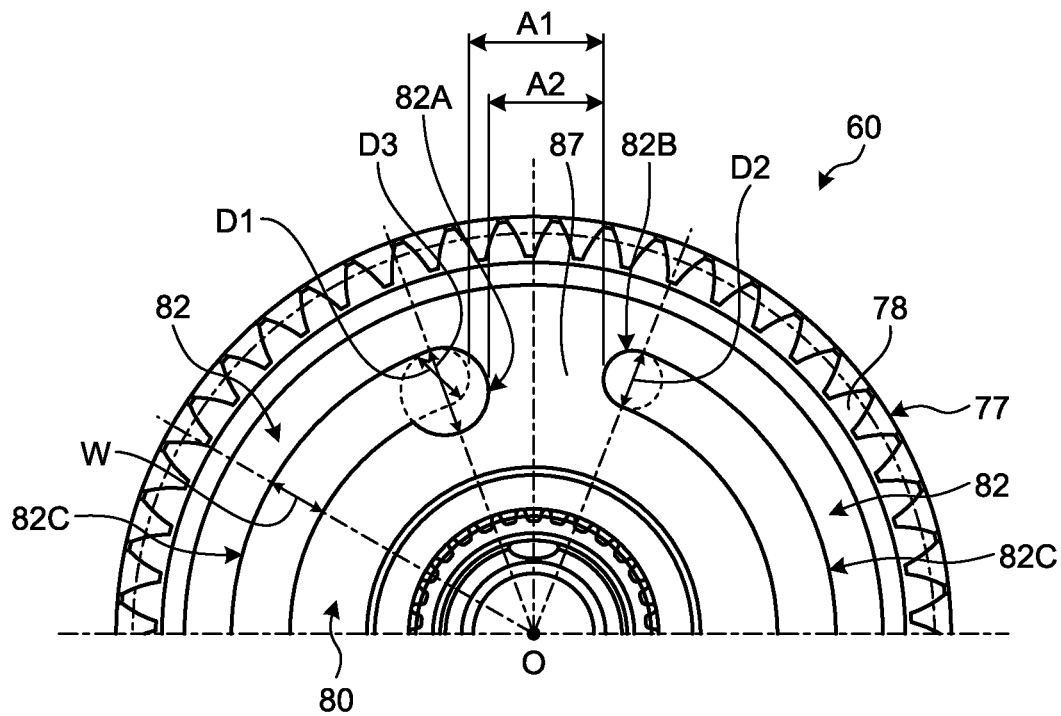
FIG. 3A and FIG. 3B, are diagrams illustrating shapes of holes formed in both end portion of a through hole in a circumference direction; and part (a) of FIG. 4 is a diagram illustrating a portion of a counter driven gear pulled while the vehicle travels forward; and part (b) of FIG. 4 is a diagram illustrating a portion of the counter driven gear pulled while the vehicle travels backward.
Figure 3B:
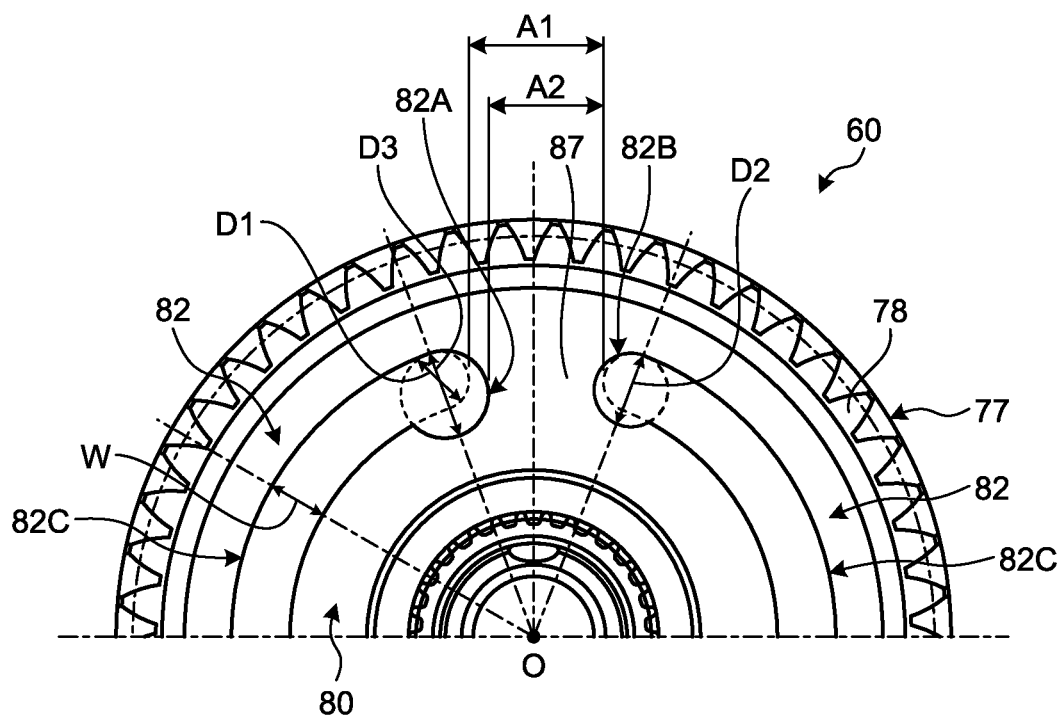

FIG. 2 is a view illustrating a shape of the counter driven gear 60. FIGS. 3A and 3B are views illustrating shapes of holes formed in both end portions of the through hole 82 in the circumference direction.

In the present embodiment, for example, the stiffness (strength) of the meshing point of the counter driven gear 60 varies in the circumference direction (rotational direction), due to the shape of the counter driven gear 60 as illustrated in FIG. 2. As a result, the dynamic stiffness with respect to the meshing point with the output gear 22 varies and thus the vibration characteristics vary, whereby the gear noise is reduced.

The dynamic stiffness is a stiffness expressed in relation to dynamic displacement/deformation, and it is strictly different from a stiffness (static stiffness) expressed in relation to static displacement/deformation. However, the stiffness and the dynamic stiffness could be in one-to-one relationship. Thus, in the present embodiment, the stiffness is assumed to include the concept of the dynamic stiffness. Further, the strength in the present embodiment corresponds to a concept including stiffness and dynamic stiffness.

The counter driven gear 60 illustrated in FIG. 2 has an outer circumference portion 77 provided with outer circumference teeth 78, which are oblique teeth that mesh with outer circumference teeth, which are oblique teeth, of the output gear 22. Furthermore, since the outer circumference teeth 78 are formed as oblique teeth, when the outer circumference teeth 78 mesh with the outer circumference teeth of the output gear 22, force is applied in three directions of the radial direction, the tangential direction and the axial direction, whereby minute deflection (displacement) occurs.

Furthermore, in a disk portion 80, which is a disk-shaped portion of the counter driven gear 60, three through holes 82 are formed at an equal angular interval in the circumference direction of the disk portion 80 (hereinafter, also simply referred to as "circumference direction"). The through holes 82 each include a large hole 82A and a small hole 82B that are formed on respective end portions in the circumference direction, as well as a slit-shaped slit 82C that is positioned at a center portion in the circumference direction and connects the large hole 82A and the small hole 82B to each other. Thus, as illustrated in FIG. 2, the through hole 82 has an asymmetrical shape in the circumference direction.

The large hole 82A has a shape in which an arc of a circle having a diameter D3 larger than a circle having a diameter D1, indicated by a broken line in FIGS. 3A and 3B, is continuous with sides of the slit 82C extending in the circumference direction. Furthermore, the large hole 82A is open to spread more toward the inner circumference side than the slit 82C in a radial direction of the disk portion 80 (hereinafter, also simply referred to as "radial direction"). The small hole 82B has a shape in which the arc of the circle having the diameter D2 smaller than the circle having the diameter D3 of the large hole 82A is continuous with the sides of the slit 82C extending in the circumference direction. In the present embodiment, the diameter D2 of the small hole 82B is the same as a slit width W of the slit 82C, the slit width W being on a radius extending from the center O of the counter driven gear 60. The diameter D2 of the small hole 82B is the same as the diameter D1. The diameter D2 of the small hole 82B is equal to (as shown in FIG. 3A) or larger (as shown in FIG. 3B) than the slit width W, which is the width of the slit 82C in the radial direction, and smaller than the diameter D3 of the large hole 82A, and is preferably larger than the slit width W and smaller than the diameter D3.

The diameter D3 of the large hole 82A is larger than the slit width W of the slit 82C. Therefore, the stiffness of a portion of the outer circumference portion 77 corresponding to the large hole 82A of the through hole 82 is lower than the stiffness of a portion of the outer circumference portion 77 corresponding to the slit 82C of the through hole 82. Furthermore, since the diameter D3 of the large hole 82A is larger than the diameter D2 of the small hole 82B, the stiffness of the portion of the outer circumference portion 77 corresponding to the large hole 82A is lower than the stiffness of a portion of the outer circumference portion 77 corresponding to the small hole 82B. Furthermore, in the circumference direction of the disk portion 80, the stiffness of a portion of the outer circumference portion 77 formed on the outer circumference side of a pillar portion 87, which is a portion where the through hole 82 is not formed, is higher than a portion of the outer circumference portion 77 formed over the through hole 82.

Therefore, in the outer circumference portion 77 of the counter driven gear 60, the stiffness in the portion corresponding to the pillar portion 87 is the highest, stiffness in the portion corresponding to the large hole 82A is the lowest, and the stiffness of the outer circumference portion 77 complicatedly varies along the circumference direction (rotation direction) of the counter driven gear 60. With the stiffness of the outer circumference portion 77 of the counter driven gear 60 complicatedly varying in the circumference direction (rotation direction), the vibration characteristics of the counter driven gear 60 complicatedly vary in accordance with a change in the meshing point where the power of the counter driven gear 60 is transmitted. This provides, for example, an effect of suppressing vibration amplification due to resonance of the surface of the case 30 or the like. Thus, with the through holes 82 formed in the counter driven gear 60, the variation in the stiffness of the outer circumference portion 77 in a complicated manner results in the vibration characteristics also complicatedly varying in the circumference direction (rotational direction), whereby the gear noise generated at the meshing point of the counter driven gear 60 can be reduced.

When the diameter D2 of the small hole 82B is larger than the slit width W of the slit 82C and smaller than the diameter D3 of the large hole 82A, the stiffness of the portion of the outer circumference portion 77 corresponding to the small hole 82B is lower than the stiffness of the portion of the outer circumference portion 77 corresponding to the slit 82C. Therefore, compared with a configuration with the diameter D2 of the small hole 82B and the slit width W of the slit 82C being the same, the stiffness of the outer circumference portion 77 can vary in the circumference direction (rotational direction) of the counter driven gear 60 more complicatedly and thus the vibration characteristics can more complicatedly vary, whereby gear noise can be more effectively reduced.

The counter driven gear 60 having the through holes 82 involves the following two contradictory factors. Specifically, as the first factor, it is better that, in terms of gear noise, a diameter of the hole formed at the end portion of the through hole 82 in the circumference direction is large, and stiffness of the portion of the outer circumference portion 77 corresponding to the hole becomes low. As the second factor, it is better that, in terms of the strength of the counter driven gear 60, a diameter of the hole formed at the end portion of the through hole 82 in the circumference direction is small.

Part (a) of FIG. 4 is a diagram illustrating a portion of the counter driven gear 60 pulled when the vehicle travels forward. Part (b) of FIG. 4 is a diagram illustrating a portion of the counter driven gear 60 pulled when the vehicle travels backward.

As illustrated in part (a) of FIG. 4, while the vehicle travels forward, the counter driven gear 60 rotates in the counterclockwise direction by receiving a load input, in a load input direction indicated by an arrow in the figure, from the meshing point (the rear end position of an arrow indicating a load input direction in the drawing) with the output gear 22 (not shown). In this process, the counter driven gear 60 has a portion that is pulled. The portion is close to and on the upstream side of the meshing point in the rotation direction of the counter driven gear 60. With respect to the through hole 82, the portion that is pulled is in and in the vicinity of the small hole 82B that is positioned on the downstream side of the through hole 82 in the circumference direction.

As illustrated in part (b) of FIG. 4, while the vehicle travels backward, the counter driven gear 60 is rotated in the clockwise direction by receiving a load input, in a load input direction indicated by an arrow in the figure, from the meshing point (the rear end position of an arrow indicating a load input direction in the drawing) with the output gear 22 (not shown). In this process, the counter driven gear 60 has a portion that is pulled. The portion is close to and on the upstream side of the meshing point in the rotation direction of the counter driven gear 60. With respect to the through hole 82, the portion that is pulled is in and in the vicinity of the large hole 82A that is positioned on the downstream side in the circumference direction of the through hole 82.

Generally, forward torque and backward torque of a vehicle satisfies a relationship "forward torque>reverse torque". Thus, the portion pulled while the vehicle travels forward involves higher stress than the portion pulled while the vehicle travels backward, and thus is more limited in terms of strength. Thus, the hole needs to be smaller for the portion pulled while the vehicle travels forward, considering the limitation in terms of strength due to the high stress. On the other hand, a large hole can be formed in the portion pulled while the vehicle travels backward, because the limitation in terms of strength is lighter than the portion pulled while the vehicle travels forward.

In view of this, in the present embodiment, of both end portion of the through hole 82 in the circumference direction, the end portion that receives the pulling force while the vehicle travels backward has a hole formed to be larger in the radial direction than that in the end portion on the side receiving the pulling force while the vehicle travels forward. Thus, in the present embodiment, the through hole 82 is formed to have an asymmetrical shape in the circumference direction, with the large hole 82A formed in the portion that is pulled while the vehicle travels backward and with the small hole 82B formed in the portion that is pulled while the vehicle travels forward.

As illustrated in FIGS. 3A and 3B, a relationship "A2<A1" is satisfied, where A1 is a distance between end portions adjacently arranged with the pillar portion 87 provided in between in a configuration with the through hole 82 having a symmetrical shape in the circumference direction and A2 is a distance between end portions adjacently arranged with the pillar portion 87 provided in between in a configuration with the through hole 82 having an asymmetrical shape in the circumference direction. Thus, the overall stiffness of the counter driven gear 60 with the through holes 82 having an asymmetrical shape in the circumference direction is lower than that in the configuration with the through holes 82 having a symmetrical shape in the circumference direction. That is, the overall stiffness of the counter driven gear 60 can be lowered by lowering the stiffness of the portion corresponding to the end portion on the side that receives the pulling force while the vehicle travels backward.

As described above, in the counter driven gear 60 which is a vehicle gear according to the embodiment, the through hole 82 has an asymmetrical shape in the circumference direction with the end portion on the side receiving the pulling force while the vehicle travels backward provided with a hole larger in the radial direction that that in the end portion on the side receiving the pulling force while the vehicle travels forward. Thus, a lower stiffness can be achieved compared with the configuration with the through hole 82 having a symmetrical shape in the circumference direction, without largely compromising the strength, whereby the gear noise can be effectively reduced.

Further, in the present embodiment, since the through hole 82 has an asymmetrical shape in the circumference direction, there is no resonance mode due to the symmetrical configuration, whereby higher gear noise reduction effect can be achieved.

Furthermore, the present embodiment featuring the large hole 82A and the small hole 82B formed in both end portions of the through hole 82 in the circumference direction can achieve a lower weight of the counter driven gear 60, compared with the case where the small holes 82B are formed in both end portions of the through hole 82 in the circumference direction.

The vehicle gear according to the present disclosure can have lower stiffness, without largely compromising the strength, and thus provides an effect of reducing the gear noise.

According to an embodiment, the stiffness of the portion corresponding to the end portion receiving the pulling force while the vehicle travels backward can be made low. The portion that receives the pulling force while the vehicle travels backward is less limited in terms of strength than the portion that receives the pulling force while the vehicle travels forward. Thus, the stiffness of the vehicle gear can be reduced without largely compromising the strength. Furthermore, the stiffness of the outer circumference portion varies complicatedly in the circumference direction resulting in the vibration characteristics also complicatedly varying similarly. Thus, gear noise produced at a meshing point of the vehicle gear can be effectively reduced.

According to an embodiment, the stiffness of the outer circumference portion varies more complicatedly in the circumference direction resulting in the vibration characteristics also more complicatedly varying similarly. Thus, gear noise produced at a meshing point of the vehicle gear can be more effectively reduced.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle gear comprising:
 a disk portion having a disk shape and a plurality of through holes formed in a rotation direction of the vehicle gear; and
 an outer circumference portion having outer circumference teeth formed on an outer circumference side of the disk portion, wherein
 each of the through holes includes a first hole formed on one end of the through hole in the rotation direction, the one end arranged on a downstream side in the rotation direction of the vehicle gear when the vehicle drives backward, and a second hole formed on another end in the rotation direction, the another end arranged on the downstream side in the rotation direction when the vehicle drives forward, a relative torque difference between the rotation direction when the vehicle drives forward and the rotation direction when the vehicle drives backward being such that a forward torque is greater than a reverse torque,
 each of the through holes further includes:
 a slit formed in a center portion of the each through hole, the slit having a width smaller than a width of the first hole in a radial direction of the disk portion, the slit connecting the first hole and the second hole to each other, and
 wherein for each through hole:
 the first hole has a shape in which an arc of a circle having a diameter larger than the width of the slit is continuous with a side of the slit extending in the rotation direction, and
 the second hole has a shape in which an arc of a circle having a diameter smaller than the diameter of the first hole is continuous with the side of the slit extending in the rotation direction, and
 the diameter of the first hole is larger than the diameter of the second hole in the radial direction.

2. The vehicle gear according to claim 1, wherein the diameter of the second hole is larger than the width of the slit in the radial direction.

* * * * *